(12) United States Patent
Magalhaes et al.

(10) Patent No.: US 6,869,562 B1
(45) Date of Patent: Mar. 22, 2005

(54) GAS INJECTION MOULDING METHOD AND APPARATUS

(75) Inventors: Rui Miguel de Azevedo Magalhaes, Leamington Spa (GB); Gordon Frederick Smith, Warwick (GB)

(73) Assignee: University of Warwick (GB)

(*) Notice: Subject to any disclaimer, the term of this patent is extended or adjusted under 35 U.S.C. 154(b) by 547 days.

(21) Appl. No.: 09/618,079

(22) Filed: Jul. 17, 2000

(30) Foreign Application Priority Data

| Jul. 17, 1999 | (GB) | ............................................ 9916740 |
| Jun. 1, 2000 | (GB) | ............................................ 0013181 |

(51) Int. Cl.[7] .......................................... B29D 22/00
(52) U.S. Cl. ..................................................... 264/572
(58) Field of Search ........................................ 264/572

(56) References Cited

U.S. PATENT DOCUMENTS

| 3,926,011 | A | | 12/1975 | Sollami ........................ 62/514 |
| 4,923,667 | A | * | 5/1990 | Sayer .......................... 264/572 |
| 5,096,655 | A | | 3/1992 | Baxi et al. |
| 5,204,050 | A | * | 4/1993 | Loren ........................... 264/504 |
| 5,295,800 | A | * | 3/1994 | Nelson et al. ................ 425/130 |
| 5,705,201 | A | | 1/1998 | Ibar ............................. 425/130 |
| 5,728,325 | A | | 3/1998 | Blankenburg |
| 6,666,999 | B1 | * | 12/2003 | Orsen ............................ 264/85 |

FOREIGN PATENT DOCUMENTS

| DE | 1 397 513 | 6/1975 |
| DE | 00 3 936 289 A | 5/1991 |
| DE | 40 24 549 A1 | 2/1992 |
| DE | 19505 633 A1 | 8/1996 |
| EP | 0 467 201 A2 | 1/1992 |
| EP | 0 576 881 A1 | 1/1994 |
| EP | 0 684 119 A2 | 11/1995 |
| EP | 0 745 468 A1 | 12/1996 |
| EP | 0 876 891 A1 | 11/1998 |
| GB | 1 432 333 | 4/1976 |
| GB | 2 260 932 A | 5/1993 |
| GB | 2 287 211 A | 9/1995 |
| GB | 2 298 610 A | 9/1996 |
| GB | 2 203 815 A | 3/1997 |
| GB | 2 322 094 A | 8/1998 |
| GB | 2 350 814 A | 12/2000 |
| GB | 2 351 694 A | 1/2001 |
| JP | 600025725 A | 2/1985 |
| JP | 006091686 A | 4/1994 |
| JP | 060278199 A | 10/1994 |

OTHER PUBLICATIONS

UK Search Report dated Jul. 14, 2000 under Section 17, Serial No. GB 0013181.3.
EP Search Report dated Jan. 8, 2003, Serial No. 00306075.3.
UK Patent Office Search Report Completed on Jun, 28, 2001.
UK Patent Office Search Report Completed on Jun. 28, 2001.
UK Patent Office Search Report Completed on Jun. 28, 2001.
UK Patent Office Search Report Completed on Jun. 28, 2001.
RD 000038806, Jul. 20, 1996.

* cited by examiner

*Primary Examiner*—Suzanne E. McDowell
(74) *Attorney, Agent, or Firm*—Foley Hoag LLP (57) ABSTRACT

A gas injection moulding method comprising injecting a melt into a mould and injecting gas into the melt to form a gas cavity in the melt, wherein the melt is cooled by use of injection gas cooled to below the external ambient air temperature and/or by a continuous flow of injection gas through the mould.

12 Claims, 8 Drawing Sheets

GAS INJECTION MOULDING METHOD AND APPARATUS

This invention relates to an improved method and apparatus for gas injection moulding.

In conventional gas assisted or gas injection moulding methods, melt material is first injected into a mould. The melt, which may be a polymer or other suitable material, is then forced against the interior of the mould using injected gas within the melt The melt and mould are then allowed to cool so that the melt hardens forming the injected moulding product, this cooling stage being by far the longest part of the injection moulding cycle. Minimisation of this cooling stage is extremely important, as it has a major influence on the reduction of the overall injection moulding time. This also has capital benefits in reducing manufacturing costs.

It is an object of the present invention to provide an improved method of, and apparatus for, gas injection moulding.

According to one aspect of the invention there is a method of gas injection moulding comprising injecting a melt into a mould and injecting gas into the melt to form a gas cavity in the melt, wherein the injection gas is cooled preferably to below the external ambient air temperature before being injected into the melt.

According to another aspect of the invention, there is a gas injection moulding method comprising injecting a melt into a mould and injecting gas into the melt to form a gas cavity in the melt, utilising injection gas having a temperature lower than that of ambient air temperature.

According to a further aspect of the invention, there is a gas injection moulding method using a mould having a melt inlet aperture, gas inlet aperture and gas outlet aperture, comprising the following stages:
(a) injecting a melt into the mould;
(b) injecting gas from the inlet aperture in the mould into the melt to form a gas cavity within the melt;
(c) forming a gas channel between the gas cavity and the gas outlet aperture in the mould and
(d) providing gas flow through the cavity between the gas inlet and outlet apertures.

According to another aspect of the invention, there is provided a gas injection moulding method wherein a mould is provided comprising gas inlet and gas outlet apertures and the method includes the step of flowing the injection gas between the gas inlet and outlet apertures in use.

Preferably, the injection gas is nitrogen. The temperature of the injected gas may be in the range 0° C. to −176° C., preferably in the range −10° C. to −50° C., and most preferably about −25° C. The pressure of the gas in the mould can be in the range 10 to 350 bar.

According to yet another aspect of the invention, there is provided apparatus for gas injection moulding comprising a mould having inlet apertures for the ingress of gas and melt material into the mould, wherein, melt material is injected into the mould and gas is injected into the melt material to form a gas cavity in the melt, and wherein gas having a temperature lower than the ambient air temperature is used as the injection gas.

According to a yet further aspect of the invention, there is provided an apparatus for gas injection moulding comprising a mould having inlet apertures for the ingress of gas melt material into the mould, and outlet apertures for the egress of gas and melt from the mould, and wherein use of the apparatus comprises the following stages:
(a) injecting a melt into the mould;
(b) injecting gas from an inlet aperture in the mould into the melt to form a gas cavity within the melt:
(c) forming a gas channel between the gas cavity and a gas outlet aperture in the mould and
(d) providing gas flow through the cavity between the gas inlet and outlet apertures.

Preferably, the channel between the gas cavity and the outlet aperture is formed by forcing a stream of gas from the outlet aperture toward the cavity. The channel between the gas cavity and the outlet aperture may be formed by perforating the melt using a moveable needle at the outlet aperture.

The gas injection moulding apparatus may comprise a heat exchanger to cool the injection gas prior to injection into the mould. This heat exchanger may comprise a coiled section of piping, through which injection gas flows, and this coiled portion of piping may be immersed in a liquid having a lower temperature than that of the gas, so cooling the gas. The cooling liquid could be, for example, liquid nitrogen.

The injection gas may be at a lower temperature than the ambient air temperature and/or may be nitrogen. As before, the temperature of the injection gas may be in the range 0° C. to −176° C., preferably in the range −10° C. to −50° C., and more preferably around −25° C.

The gas may enter or exit the mould by means of injection needles, A further aspect of the invention is a gas injection needle comprising a first part defining a gas channel and a movable member that can extend beyond the first part thereby to extend the gas channel. Preferably, the moveable member is located coaxially within the gas channel, and the moveable member preferably is elongate and movable axially within the gas channel. Most preferably, the movable member is displaced to extend beyond the end of the gas channel.

Another aspect of the invention is a gas injection/exhaust needle for use in injection moulding comprising a gas channel and a shutoff member moveable by activating means from a closed position to an open position in which open positron the shutoff member is retracted into the body of the needle. Preferably, the shutoff member is located co-axially within the gas channel and is elongate and moveable axially within the gas channel. Preferably the activating means comprises a rod and piston activated pneumatically or hydraulically. Most preferably, the shutoff member is moveable to the open position by the action injection gas pressure on a first face of the piston and/or the shutoff member is moveable to the closed position by the application of pneumatic pressure on a second face of the piston. Preferably, the injection gas exits or enters the gas channel through an aperture at the open end of the channel. The injection gas may exit or enter the gas channel through at least one aperture located in the wall of the channel. The injection gas may exit or enter the gas channel radially and the end of the channel may be sealed. The injection gas may exits or enter the gas channel at an angle to the axis of the channel.

Gas injection moulding apparatus in accordance with the invention will now be described, by way of example only, with reference to the following schematic drawings in which:

FIGS. 2 (*a*) and (*b*) show two method stages of gas injection moulding in accordance with one aspect of the invention;

FIGS. 3 (*a*), (*b*) and (*c*) show three method stages of gas injection moulding in accordance with another aspect of the invention;

FIGS. 4 (*a*), (*b*), and (*c*) presents a flow diagram summarising alternative process stages of gas injection moulding methods in accordance with the invention;

FIGS. 6, (a) and (b) schematically show two operational states of the end of the gas injection needle shown in FIG. 5;

FIGS. 11 (a) and (b) show another needle sleeve for use with the second gas injection needle.

Figure 1:
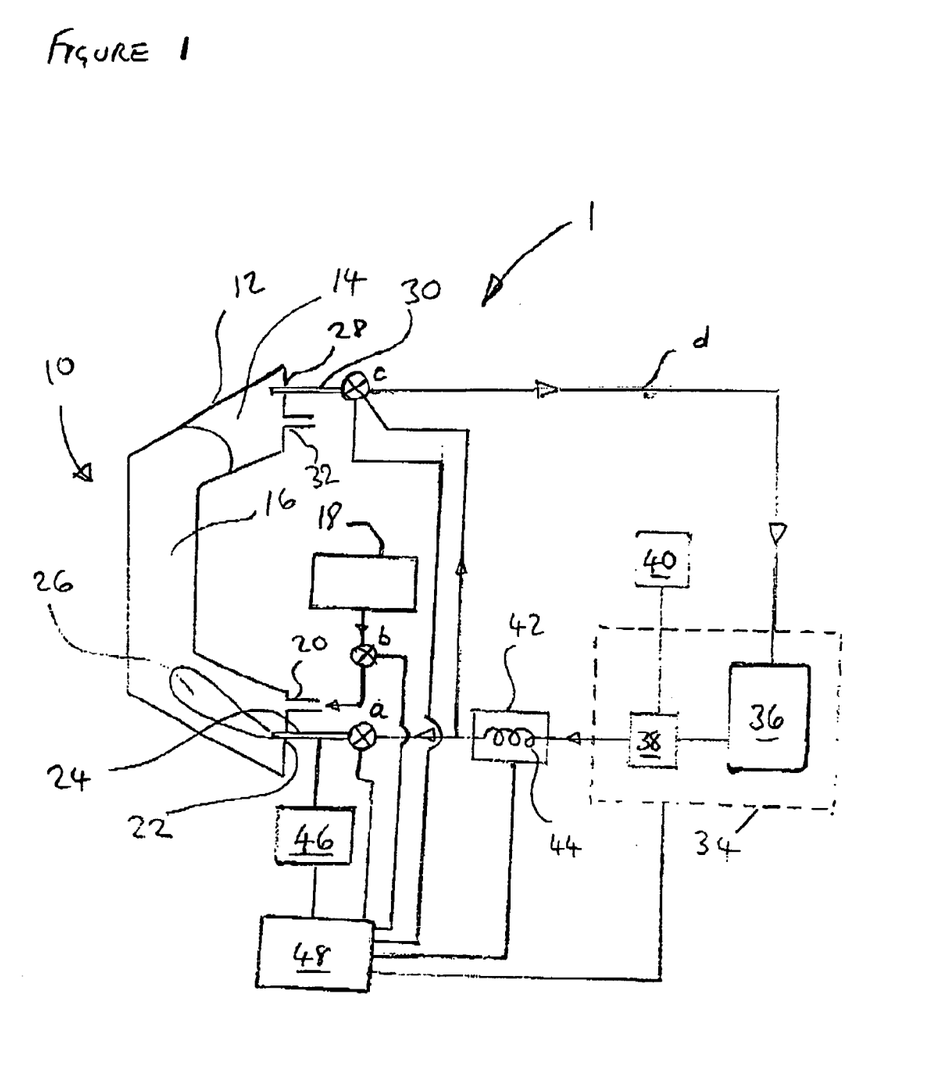
FIG. 1 is a schematic diagram of a gas injection moulding system for use in accordance with the invention.

Referring to FIG. 1, a gas injection moulding system 1 comprises gas injection moulding apparatus 10 and associated process control equipment. Moulding apparatus 10 comprises a mould 12, which may be a two part type mould or any other type known in the art, that defines a mould cavity 14. Melt material 16 is injected into the mould cavity 14 from a melt reservoir 18, and via a melt inlet aperture 20. A gas inlet aperture 22, which may comprise an injection needle 24, allows injection of gas 26 into the melt 16. A corresponding gas outlet 28 which can comprise needle 30 may also be provided, as well as an outlet 32 for the melt.

Associated process control equipment is provided to control the ingress and egress of gas and melt to and from the mould cavity 14. Injection gas, for example nitrogen, is supplied by gas injection equipment 34 comprising a gas generation unit 36 and gas pressure control module 38, the pressure control module 38 being controlled by a set point input handle 40. In one aspect of the invention, the injection gas line may comprise a heat exchanger 42 to cool the gas prior to its injection into the mould cavity 14 and the heat exchanger may comprise a coil 44 immersed in a cooling material such as liquid nitrogen. In a further aspect of the invention the gas injection needles 24 and/or 30 may be movable (as described later) and in this case are actuated by, for example, an actuator 46 controlled by a controller 48 as shown for needle 24. A controller 48 may also be used to control other aspects such as the gas injection equipment 34 and the heat exchanger 44, as well as various process valves shown at a, b and c for example. It may be possible to recycle the injected gas once it has passed through the mould as shown by a process stage d. However, this may not be an advantage as the injection gas is readily available and recirculation of the gas can cause contamination in the gas stream by the melt material.

Figure 2:
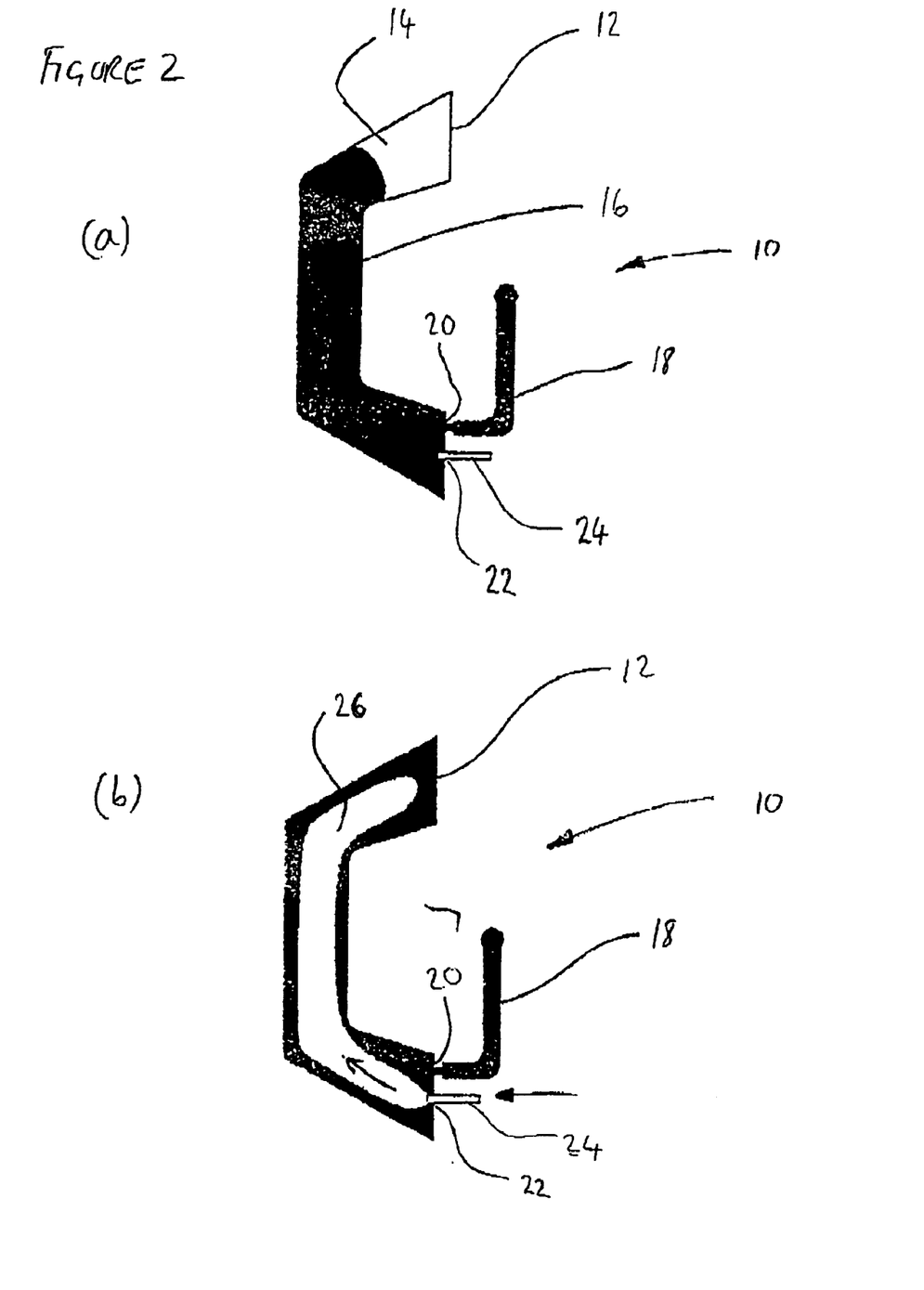

Referring to FIG. 2, parts a and b, there are shown two steps in a gas injection moulding method according to a first aspect of the invention. In FIG. 2a, a first stage of the moulding process is shown wherein a melt material 16 is injected into cavity 14 in mould 12 via aperture 20 from a melt reservoir 18. (For simplicity in this case the process valves are not shown). FIG. 2b shows the later gas injection stage of the method where gas such as nitrogen is injected through aperture 22 to form a gas cavity 26 inside the melt material. Once the gas cavity has dispersed the melt into all corners of the mould the pressure is held at a pre-set level until the melt cools and hardens. In one aspect of the present invention, the injected gas 26 is cooled to below the ambient air temperature outside the mould prior to being injected into the mould, for example by means of heat exchanger coil 44. Before injection into mould 12, the gas is preferably cooled to between 0° C. and −176° C. Within this range a preferable temperature for the gas is about −25° C. Once the melt is sufficiently dispersed, the cooled gas is held at a static pressure and thermal energy passes from the hot melt into the cooled gas, thereby providing a greater temperature gradient than if gas at ambient temperature were used, and so speeding up the cooling process. Low temperature gas is typically injected into the melt stream and then vented to atmosphere near or at the end of the cooling cycle.

In another embodiment low temperature gas is injected into the melt stream and that gas is then expanded stepwise during the cooling cycle, cooling of the injected gas thereby resulting from the well known Joule-Thompson effect. Thus, the injected gas may be vented in stage-wise to successively lower pressure levels, for example from 170 bar to 130 bar and then to 80 bar and finally to atmospheric pressure. Alternatively the injected gas may be expanded continuously from the initial pressure of for example 170 bar to a lower pressure or to atmospheric pressure.

In yet another embodiment low temper e gas is injected into the melt and then during the cooling cycle partly vented, for example from 170 bar to an intermediate pressure of, for example, 130 bar. Further gas is then injected into the melt to restore the pressure of the gas in the melt to 170 bar. This process may be repeated several times, during a cooling cycle, optionally venting the gas to a different intermediate pressure each time. Thus, each time gas is vented the above mentioned Joule-Thompson effect produces a decrease in injected gas temperature.

Reduction of injected gas temperature during the cooling cycle will increase the temperature driving force for heat-transfer from the melt to the injected gas. This will normally result in an increased rate of heat-transfer and thus an advantageous reduction in gas cooling cycle time.

Figure 3:
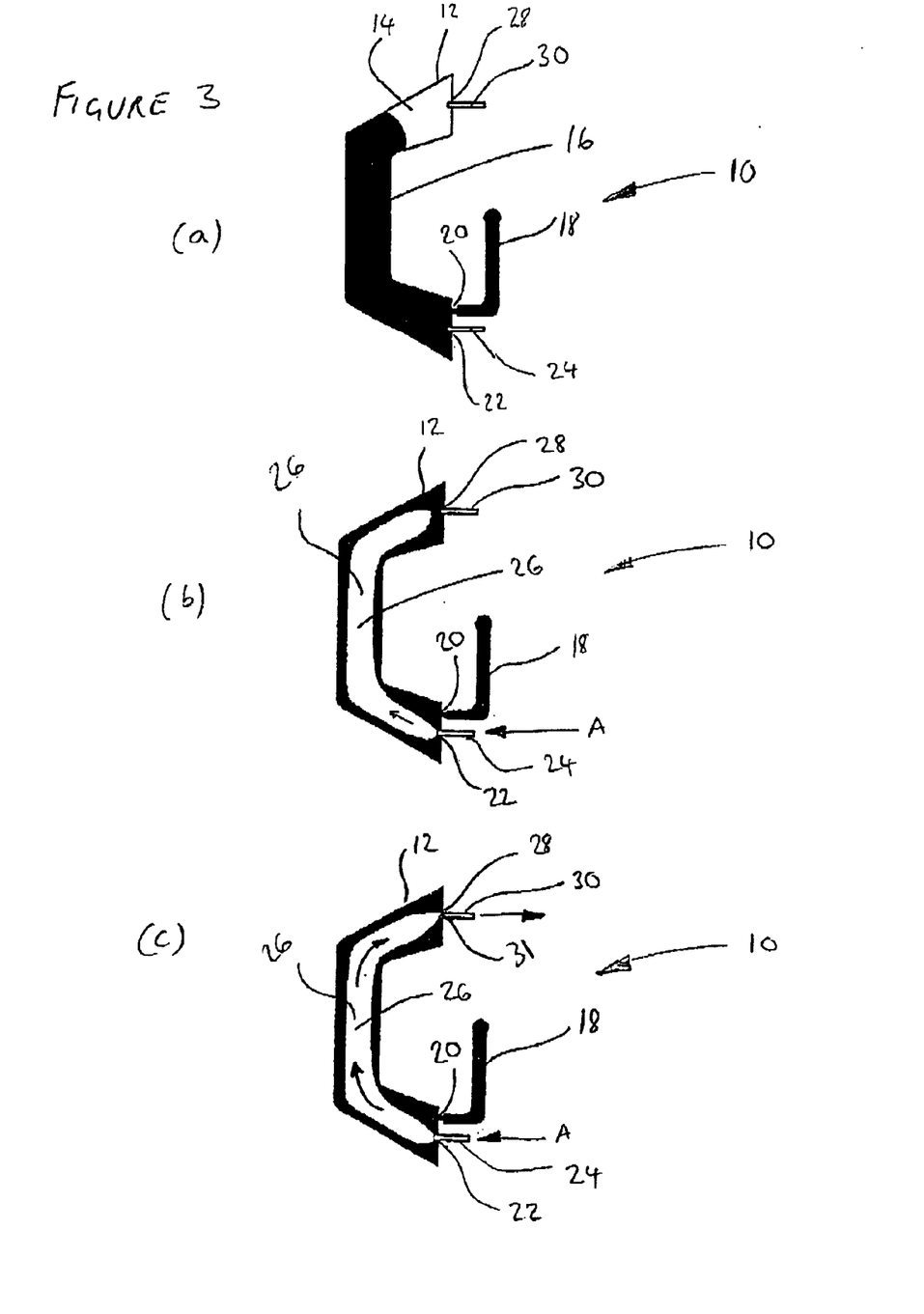

Turning to FIG. 3, a gas injection moulding process according to a flier aspect of the invention is shown. Parts a and b of FIG. 3 generally correspond to the equivalent parts to FIG. 2 but, in this case, an additional process stage is shown at c. Between process stages b and c, a channel 31 (see FIG. 3c) is formed that allows gas flow from the gas cavity 26 within the melt material 16 to a gas outlet 28, which again may be in the form of a needle 30. Tis allows circulation of the injection gas through the cavity 26 formed between the inlet 22 and the outlet 28 as shown by the direction arrows in FIG. 3c. By circulating the gas, greater heat transfer between the hot melt and the circulating gas is achieved and so the cooling time again is reduced. An even greater reduction in cooling time is achieved if cooled gas is used as in the static process already described for FIGS. 2a and b.

Figure 4:
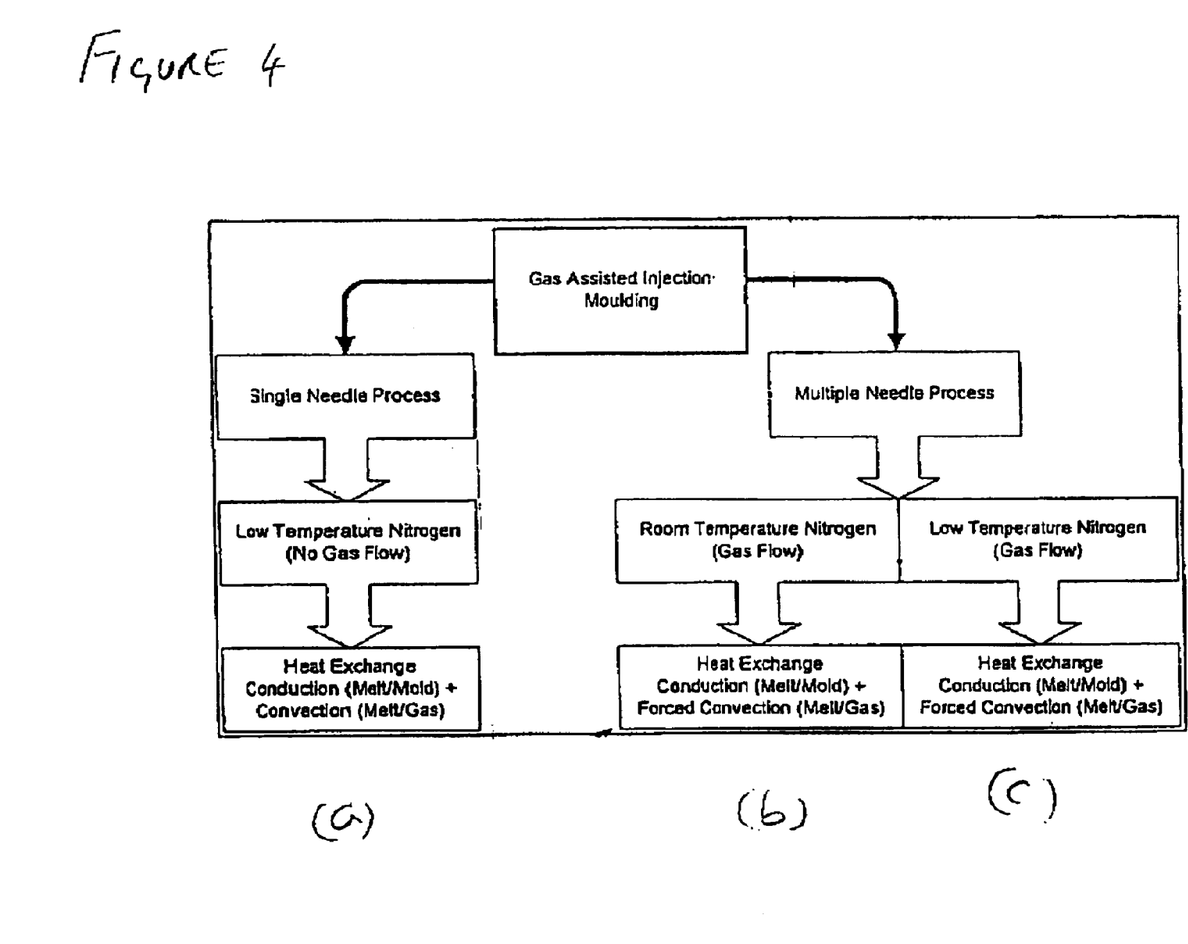

FIG. 4 summarises three aspects of the invention in a flow diagram. In FIG. 4a the process stages of the static or 'no-flow' process for example, using a single gas inlet, are shown. Low temperature gas such as nitrogen is used but it is not circulated once it has entered the mould and it is held at a static pressure. In this case heat exchange between the melt, the mould and the gas takes place by conduction between the melt and the mould as well as convection between the static gas and the melt. Parts b and c of FIG. 4 show flow diagrams for a case where gas flows through the mould once the melt has been dispersed, i.e. as already shown schematically in FIG. 3 earlier. In both cases a multiple needle aperture or injection system is needed with apertures to allow gas to both enter and exit the gas cavity and circulate to remove heat from the melt.

In the process where gas circulates in and out of the mould, a method is needed to form the channel 31 between the gas cavity and an outlet aperture, for example between the gas cavity 26 and outlet aperture 28 shown in FIG. 3.

There are several ways of achieving this, according to the gas bubble length and type of needle used.

If the gas bubble length is sufficient to reach the second needle position (e.g needle 30 in FIG. 3c), then the (thin) layer of material covering this needle can be removed by the use of high pressure gas injected through this needle (30). Alternatively, in the event of a greater thickness of material covering the second, or outlet needle, a channel can be formed by injecting a reverse flow of gas at this second needle, or a movable needle can be used, as described below.

Figure 5:
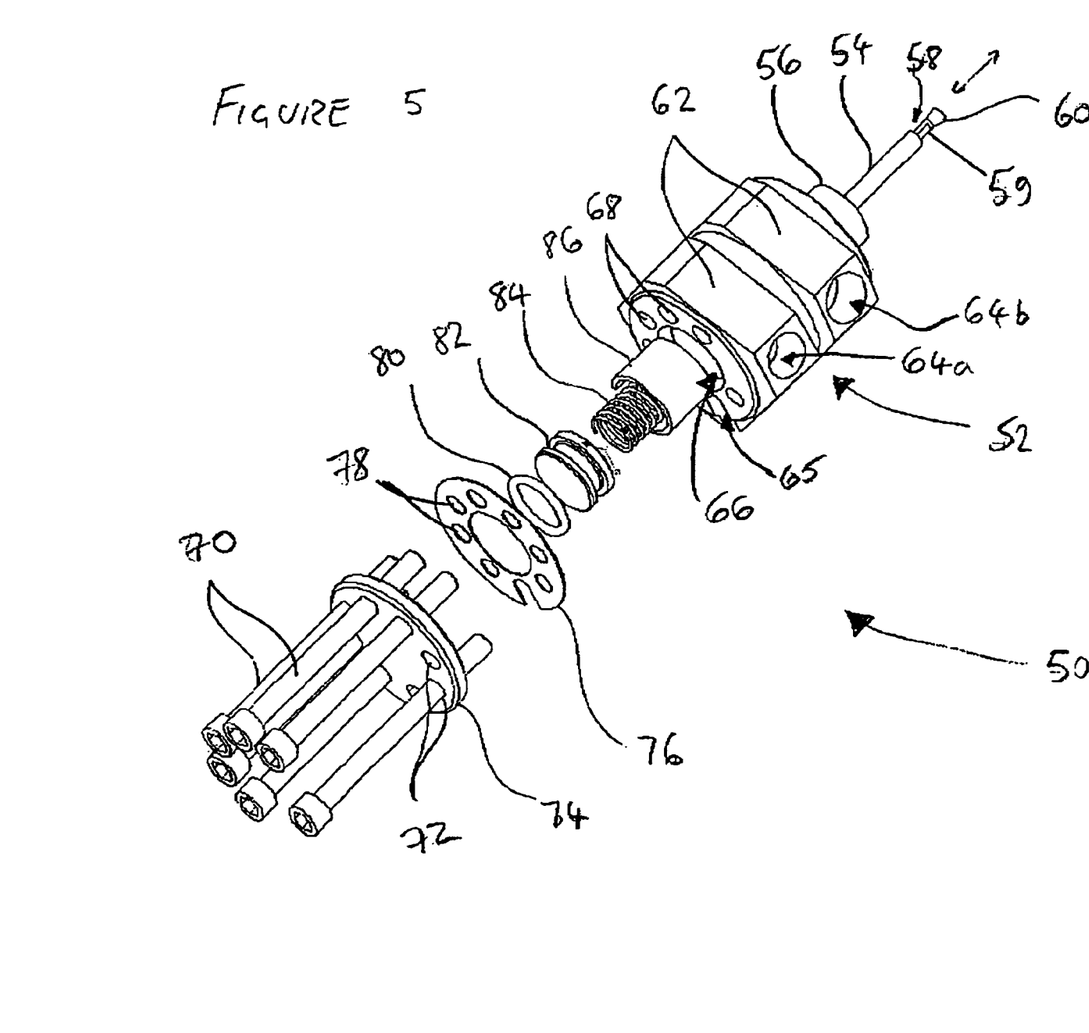
FIG. 5 is an exploded view of a first gas injection needle assembly used in accordance with the invention.
Figure 6:
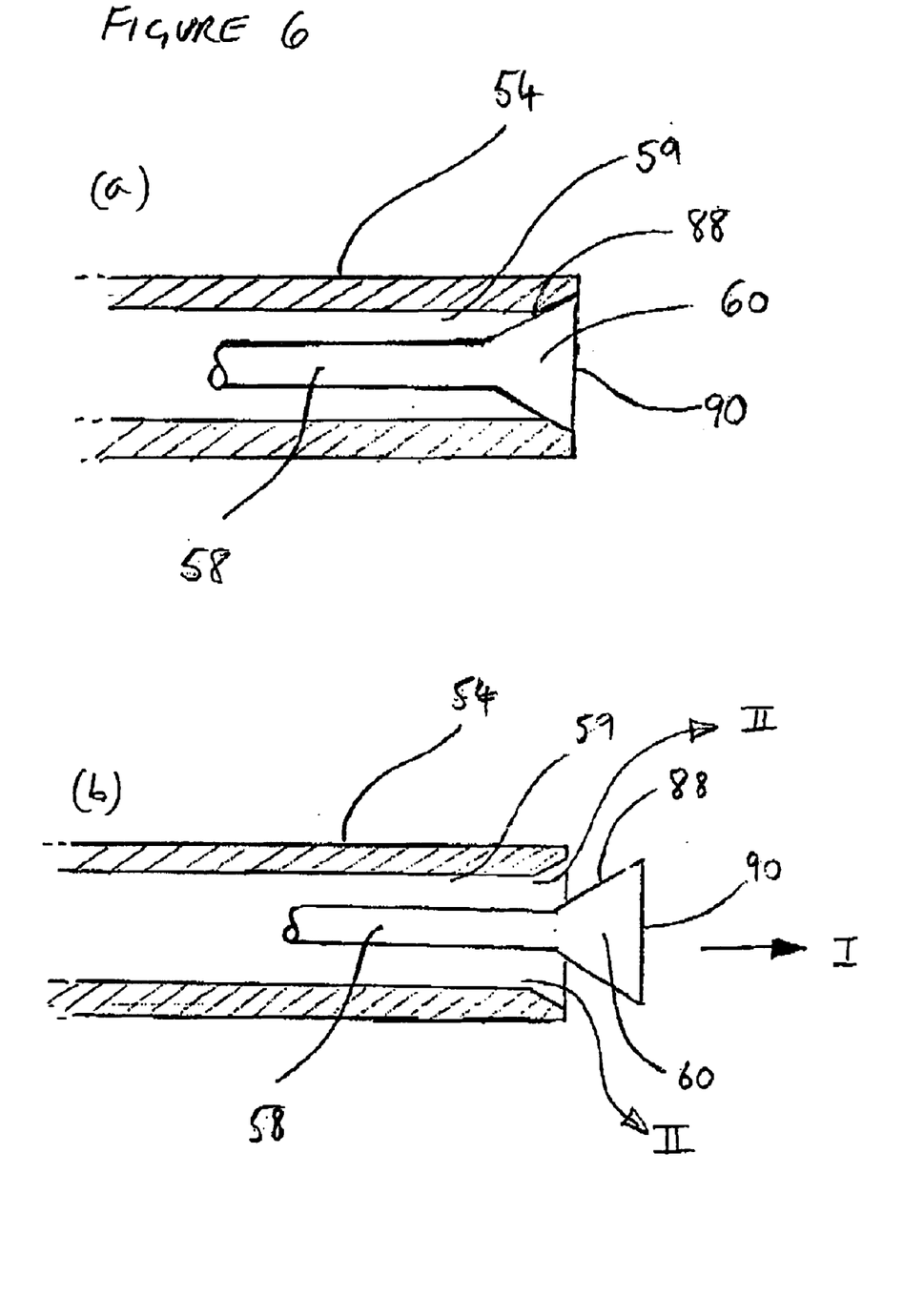

FIGS. 5 and 6 show a first gas injection nozzle assembly that can be used in the apparatus of the invention Referring to FIG. 5, a retractable or movable venting needle 50 is shown, comprising a needle body 52 and a gas channel or needle sleeve 54. Channel 54 is connected to body 52 via an annular attachment 56. A movable central needle member or pin 58 is located co-axially within sleeve 54. In use, channel 54 directs gas to or from the melt. Pin 58 has a groove 59 and a conical end section 60. Pin 58 can move axially out or in channel or sleeve 54 as shown by the double headed arrow. The body 52 of the needle device may have planar surfaces 62 to allow easy location within moulding apparatus, and respective gas inlets and gas outlets shown at 64a and 64b. Pressurised gas enters at inlet 64a, forcing pin member 58 outward and allowing gas flow from the needle. Body 52 may also comprise a notch 65, again to allow easy location of the body in a mould. A chamber or cavity 66 houses further components of the device. These components are held in position by screws 70 that pass through apertures 72 in a lid 74 of the device. The lid contains a seal 76 having screw holes 78, an o-ring seal 80, a plunger 82, a spring member, for example a coil spring 84 and a limiting sleeve 86. The limiting sleeve 86 serves to control axial displacement of pin member 58 and pin member 58 is attached to plunger 82.

FIGS. 6a and b show the function of the pin member 58 within channel 54 in more detail. As can be seen from FIG. 6, the end 60 of member 58 comprises a front planar surface 90 and a tapered conical surface 88. The tapered conical surface 88 allows easy location of end 60 against channel sleeve 54. FIG. 6a shows the situation where pin 58 is located within channel 54, that is, the case where there is no gas flow and the melt material can build up over the end of needle. In FIG. 6b a later stage is shown where pin 58 has moved outward in the direction of arrow I and gas flow is allowed in direction of arrows 11. The outward movement of the pin 58 causes its end 60 to rupture the melt layer around it forming a channel between the outlet and the gas cavity in the melt. Thus, the movable needle shown in FIGS. 5 and 6 can be used for example as needle 30 in FIG. 3 to form gas channel between the gas cavity, or bubble within the melt and a gas outlet.

As described, the invention enables reduced cooling times in gas injection moulding. This is achieved by the different aspects of the invention, namely (a) the use of cooled injection gas that is held statically within the mould and/or (b) the use of circulating gas that passes through the mould to take heat away by convection. In this latter aspect of the invention (b), either cooled gas or gas at ambient temperature may be used and the convective effect of the moving gas leads to greater heat transfer.

Experiments have been undertaken by the applicant to demonstrate the effectiveness of the invention. Thus, cooling cycle times using various embodiments of the invention have been measured Table 1 shows typical process conditions for these tests. Cavity melt temperature was recorded for the conventional (statically held gas) process initially, and then for the statically held gas process using chilled gas and finally for the circulating gas process without and with cooled gas. The material ejection temperature is considered to be 80° C. and the moulded component residual wall thickness at the temperature measurement point was 2.59 mm.

TABLE 1

Process Conditions Used in Comparative Tests of Cooling Cycle Time

| Processing Parameter | Melt Temperature (° C.) | Mould Temp (° C.) | Fill Time (sec) | Gas Delay Time (sec) | Gas Pressure Time (sec) | Gas Pressure (bar) |
|---|---|---|---|---|---|---|
| Value | 240 | 40 | 1.9 | 0.8 | 30 | 80 |

It has been found that when pre-cooled injection gas is held statically within the mould that cooling cycle time may be reduced from 51 seconds (ambient temperature injection gas) to 45 seconds (injection gas cooled to about −100° C.), thus achieving a reduction in cycle time of approximately 12%. In tests using, circulating gas passing through the mould a reduction in cycle to 42 seconds (ambient temperature circulating gas) and 40 seconds (cooled circulating gas) was observed. This represents a reduction in cycle time of approximately 17% and 23% respectively.

Figure 7:
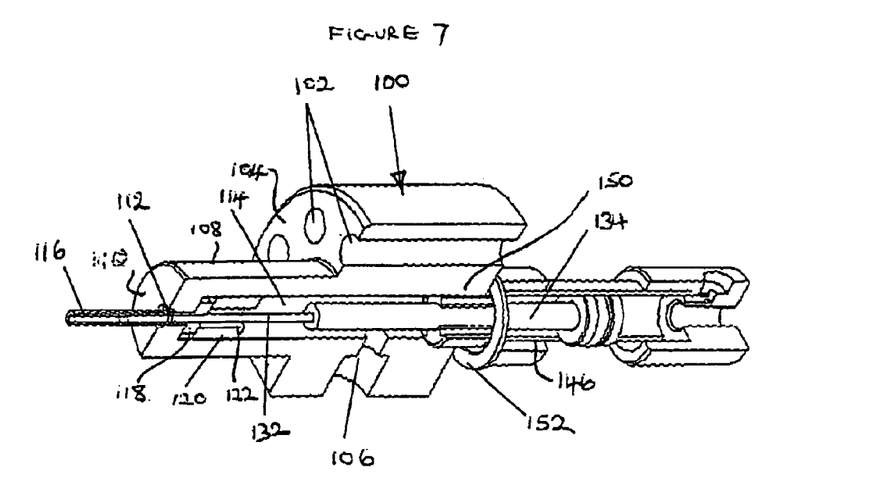
FIG. 7 is a perspective, partly cut away view of a second gas injection needle used in a further aspect of the invention.
Figure 8:
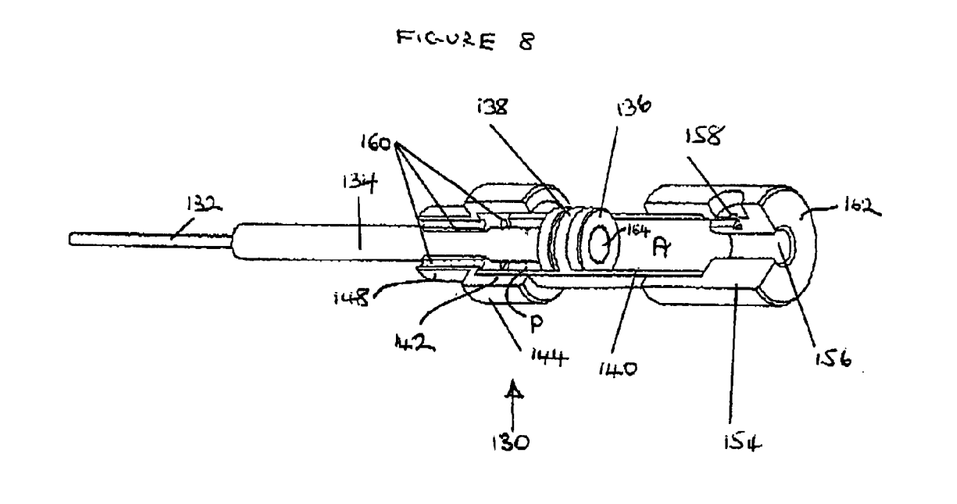
FIG. 8 is a perspective, partly cut away view of part of the gas injection needle shown in FIG. 7.
Figure 9:
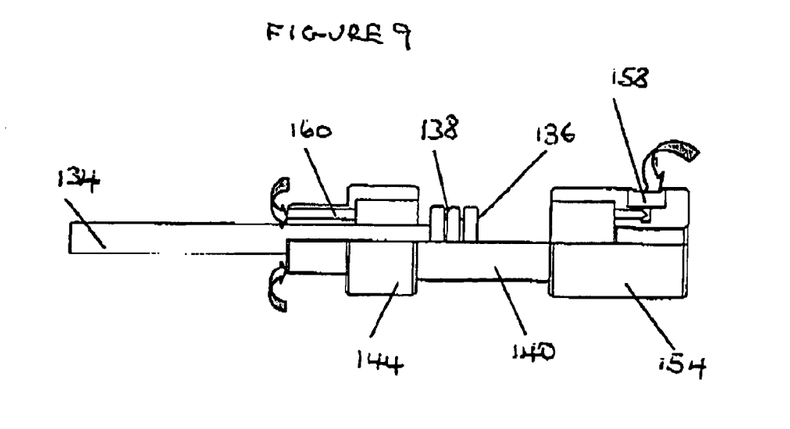
FIG. 9 is a side view of the part of the gas injection needle shown in FIG. 8.

FIGS. 7, 8 and 9 show a second gas injection/exhaust needle assembly that can be used in the apparatus of the invention and can withstand the high pressure involved in the process (up to 350 bar). Referring to FIG. 7, the gas injection needle has a main body 100 comprising a flange section 104 and a co-axially extending cylindrical section 108. The body 100 has a first gas inlet/exhaust port 106 that is supplied with high pressure gas (normally nitrogen). The cylindrical section 108 has on its end face 110 an aperture 112 that connects with a co-axial threaded circular bore 114 within the main body 100. This threaded bore 114 extends inwardly through the remainder of the cylindrical section 108 and also all of the flange section 104 of the main body 100. A needle sleeve or gas channel 116 (see also FIGS. 10–11) having a flange portion 118 at its first end is located within bore 114, its second (open) end extending axially outward from the main body 100. The needle sleeve 116 is held in place by a grub screw 120 having a central aperture 122 that allows it to be screwed into the threaded bore 114 using a tool such as an Allen key. When the needle sleeve 116 is thus fixed in place aperture 122 allows a shutoff pin (see latter) to pass therethrough.

FIG. 8 shows a double acting piston unit 130. An elongate shutoff pin 132 is attached to a piston rod 134 connected to a piston 136. The piston 136 has an o-ring seal 138 and is housed within a cylinder 140. Pin 132 may be attached to piston rod 134 by means of a screw thread. The first end of the cylinder 140 is sealed in a gas tight manner within the longer bore 142 of a generally cylindrical plug 144. Plug 144 has a smaller bore 146 dimensioned to accept piston rod 134. The plug 144 also has an outer threaded section 148 that can be screwed into and connected to a corresponding female thread 150 in flange 104 (See FIG. 7) in a gas tight manner using, for example, a Dowty (TM) seal 152. The second end of cylinder 140 is sealed in a gas tight manner to end cap 154 which has a co-axially positioned threaded bore 156 on its outer face 162. Threaded bore 156 is dimensioned to accept an inductive proximity sensor (not shown). The proximity sensor is used to indicate whether the gas injection needle (i.e. piston assembly) is in the open or closed position. High strength adhesive may be used to bond the cylinder 140 to plug 144 and end cap 154 so providing a gas tight seal. End cap 154 also has a second gas inlet port 158. This second gas inlet port 158 is during part of the process supplied with low pressure (<10 bar) compressed air, which enters portion A of the cylinder 140 and exerts pneumatic pressure on the outer face 164 of piston 136.

The needle described above by reference to FIGS. 7 to 10 can be used as either an injection needle (see FIG. 3 item 24) or an exhaust needle (see FIG. 3 item 30). It is very compact and the pressure differential across the needle is minimised through retraction of shutoff pin 132 during the gas injection and cooling phases. The body 100 is attached by pressure tight sealing means to a moulding tool (not shown) via threaded pins (not shown) that pass through holes 102 in flange section 104 of the needle. In use cylindrical section 108 of the main body 100 is inserted within an appropriately dimensioned port in the moulding tool and sealed in a gas tight manner, for example using an o-ring seal against end face 110 and around needle sleeve 116. The open end of the needle sleeve 116 may be located flush with an internal wall of the mould or it may extend within the mould.

When used as an injection needle, during the polymer injection phase a low pressure compressed air supply is pneumatically connected via the second gas inlet port 158 to side A of the cylinder 140 and this results in the piston 136, piston rod 134 and shutoff pin 132 moving axially through the main body, so that pin 132 and rod 134 seal needle sleeve 116. This prevents the melt, under pressure, from pushing the pin backwards out of its shutoff position which would eventually lead to blockage of the needle sleeve bore 132. When the gas injection phase starts, gas (typically nitrogen) under pressure is supplied through the first gas inlet/exhaust port 106 into the main body. The plug 144 has several channels 160 that allow the high pressure gas to flow from port 106 through bore 114 and plug 154 into the piston rod side P of cylinder 140 and thereby to act upon the inner face of piston 136 pushing it backwards together with piston rod 134 and shutoff pin 132. This allows flow of injection gas from port 106, through bore 114 and along the inside of sleeve 116 to the melt cavity. This action occurs almost instantaneously after the high pressure gas feed is initiated. At the same time conventional process control means are used to isolate the low pressure air supply to port 158 and to vent this port to the atmosphere.

When used as an exhaust needle, injection gas leaves the melt cavity via the inside of sleeve 116, bore 114 and inlet/exhaust port 106. The needle is closed to this gas flow by connecting the low pressure air supply to the second gas inlet port 158. At this time the pressure of the injection gas leaving the mould will normally be less than 5 bar, preferably about 1 bar.

Figure 10:
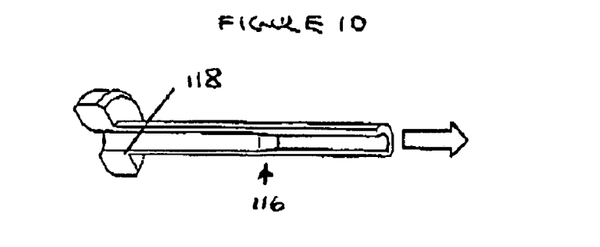
FIG. 10 is a perspective, partly cut away view of a needle sleeve for use with the second gas injection needle.
Figure 11A:
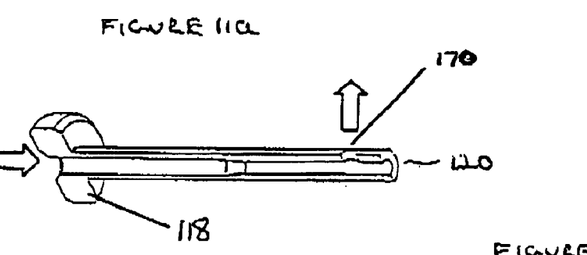
Figure 11B:
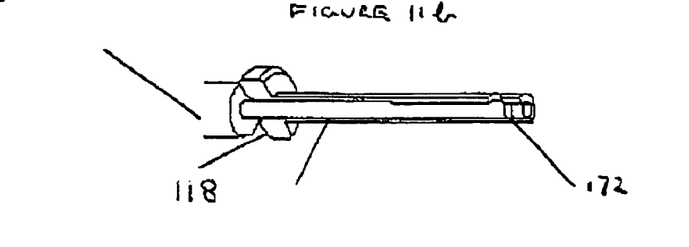

The needle sleeve 118 may take one of several forms as illustrated in FIGS. 10 and 11. FIG. 10 shows a needle sleeve 116 wherein gas enters or leaves in a generally axial direction.

FIG. 11a shows a needle sleeve having an aperture 170 in its wall and FIG. 11b a similar needle sleeve having an end stop 172 to prevent axial inlet/exhaust of gas, and thus ensure that all gas enters/exits the needle sleeve radially. By suitably inclining the bore of aperture 170 the injection gas may be directed at any desired angle to the axis. The ability to choose this angle is useful in optimising the gas injection moulding step. The needle sleeve shown in FIG. 11 allows injection gas to be delivered parallel to the polymer flow and this has been found to improve bubble symmetry and minimise surface imperfections (for example, blisters and localised surface gloss differences). A needle sleeve may be simply replaced by removing the locking grub screw 120 inside the cylindrical portion 108, thus allowing the sleeve to be slid out and replaced by one of different size or type. The locking grub screw is then returned and tightened in order to lock the new sleeve into place. The shutoff pin 132 may also have to be replaced in order to match any change in needle sleeve 116 dimensions. The shutoff pin 132 can be simply changed by unscrewing it from the piston rod 134.

The control of the low pressure air supply to the port 158 is achieved by a 3/2 way spring loaded solenoid valve. An electronic timer controls the on/off status of the solenoid valve. The electronic timer starts counting when it is energised. During the energising period the solenoid valve is open, supplying low pressure air through the port 162 and moving the pin 132 into its shutoff position. When the desired time has elapsed the electronic timer is de-energised and consequently the solenoid valve also so venting low pressure air to the atmosphere. At the same time high pressure gas (usually nitrogen) enters port 106 and results in the piston assembly moving backwards so that the needle is switched to an open position allowing high pressure gas to be injected through the needle into the polymer melt stream.

We claim:

1. A gas injection moulding method wherein a mould is provided comprising gas inlet and gas outlet apertures and the method includes the step of flowing the injection gas between the gas inlet and outlet apertures in use.

2. A gas injection moulding method according to claim 1, wherein the injection gas is cooled below the external ambient temperature before being injected into the melt.

3. A gas injection moulding method according to claim 1, wherein the temperature of the injection gas is in the range of 0° C. to −176° C.

4. A gas injection moulding method according to claim 1, wherein the temperature of the injection gas is in the range −10° C., to −50° C.

5. A gas injection moulding method according to claim 1, wherein the temperature of the injection gas it about −25° C.

6. A gas injection moulding method according to claim 1, wherein the gas pressure in the mould is in the range 10 to 350 bar.

7. A gas injection moulding method using a mould having a melt inlet aperture, gas inlet aperture and gas outlet aperture comprising the following stages:

(a) injecting a melt into the mould;

(b) injecting gas from the inlet aperture in the mould into the melt to form a gas cavity within the melt;

(c) forming a gas channel between the gas cavity and the gas outlet aperture in the mould; and (d) providing gas flow through the cavity between the gas inlet and outlet apertures.

8. A gas injection moulding method according to claim 7, wherein the injection gas is cooled below the external ambient temperature before being injected into the melt.

9. A gas injection moulding method according to claim 7, wherein the temperature of the injection gas is in the range of 0° C. to −176° C.

10. A gas injection moulding method according to claim 7, wherein the temperature of the injection gas is in the range −10° C. to −50° C.

11. A gas injection moulding method according to claim 7, wherein the temperture of the injection gas is about −25° C.

12. A gas injection moulding method according to claim 7, wherein the gas pressure in the mould is in the range 10 to 350 bar.

* * * * *